United States Patent
Ryan (12) 
(10) Patent No.: US 6,198,543 B1
(45) Date of Patent: Mar. 6, 2001

(54) COLOR TABLE LOOK-UP USING COMPRESSED IMAGE DATA

(75) Inventor: Dennis L. Ryan, Santa Ana, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/019,311

(22) Filed: Feb. 5, 1998

(51) Int. Cl.[7] .............. B41B 15/00; B41J 15/00; B41J 2/145; B41J 2/21

(52) U.S. Cl. .............. 358/1.9; 358/1.3; 358/1.8; 358/1.11; 347/41; 347/43

(58) Field of Search ................. 358/298, 523, 358/296, 529, 1.9, 1.3, 1.8, 1.11; 347/41, 43, 9, 12

(56) References Cited

U.S. PATENT DOCUMENTS

| | | | |
|---|---|---|---|
| 4,763,190 | * 8/1988 | Froelich | 358/529 |
| 5,402,245 | * 3/1995 | Motta et al. | 358/298 |
| 5,488,398 | 1/1996 | Matsubara et al. | 347/43 |
| 5,500,661 | 3/1996 | Matsubara et al. | 347/41 |
| 5,633,663 | 5/1997 | Matsubara et al. | 347/41 |

* cited by examiner

*Primary Examiner*—Edward L. Coles
*Assistant Examiner*—Twyler Lamb
(74) *Attorney, Agent, or Firm*—Fitzpatrick, Cella, Harper & Scinto (57) ABSTRACT

Compressed color image data are received, including a color table having first format data entries, each of which represents one of a number of different colors in a first data format, also including an index into the color table for each of several pixels. The first format data entries for the different colors are processed so as to obtain second format data entries, each of which represents one of the different colors in a second data format. A look-up table is then generated that includes the second format data entries for the different colors. A second format data value is then obtained for each of the pixels by using the index for the pixel to address the look-up table.

51 Claims, 7 Drawing Sheets

| INDEX | R | G | B |
|---|---|---|---|
| 0 | 25 | 103 | 12 |
| 1 | 151 | 77 | 55 |
| 2 | 16 | 4 | 7 |
| 3 | 119 | 86 | 55 |
| 12 | 48 | 81 | 241 |
| 13 | 250 | 252 | 250 |
| 14 | - | - | - |
| 15 | - | - | - |

FIG. 5

| LEFT EDGE | RIGHT EDGE | DATA LENGTH | DATA FORMAT | PIXEL DATA | COLOR TABLE RGB DATA | RGB DATA LENGTH |
|---|---|---|---|---|---|---|

| INDEX | C | M | Y | $K_c$ | $K_a$ | $P_c$ |
|---|---|---|---|---|---|---|
| 0 | 78 | 0 | 91 | 152 | 0 | 255 |
| 1 | 0 | 74 | 96 | 104 | 0 | 255 |
| 2 | 0 | 12 | 9 | 239 | 0 | 255 |
| 3 | 0 | 33 | 64 | 136 | 0 | 255 |
| 12 | 193 | 160 | 0 | 14 | 0 | 255 |
| 13 | 0 | 0 | 0 | 230 | 230 | 0 |
| 14 | - | - | - | - | - | - |
| 15 | - | - | - | - | - | - |

FIG. 8

COLOR TABLE LOOK-UP USING COMPRESSED IMAGE DATA

BACKGROUND OF THE INVENTION

1. Field of the Invention

The present invention relates to use of compressed image data to address a look-up table, and particularly concerns utilizing compressed RGB color image data to index a look-up table for providing corresponding CMYK data.

2. Description of the Related Art

Recently, 32-bit printer drivers have become available, primarily because 32-bit printer drivers can take advantage of certain features that are available for 32-bit code, but not for 16-bit code. However, for historical reasons many operating systems, such as Windows 95™, are designed to communicate only with 16-bit printer drivers. Therefore, many of the new 32-bit printer drivers actually include both a 16-bit portion, which interfaces with the operating system, as well as a 32-bit portion in which most of the actual processing is performed.

Specifically, the operating system is typically configured to receive RGB (red, green blue) print data from an application program and to provide the RGB data to a 16-bit printer driver. Accordingly, the printer driver uses its 16-bit portion to receive the RGB data. Typically, the 16-bit portion of the driver then immediately either spools the RGB data to a spool file for use by the 32-bit portion or else directly transfers the data to the 32-bit portion of the driver.

Upon receipt of the RGB data, or access to the spool file in the event of spooling, the 32-bit portion ordinarily first performs color matching. Color matching involves converting the input RGB data into CMYK (cyan, magenta, yellow and black) data and frequently includes performing data corrections based on the source of the RGB data. Thereafter, the 32-bit portion of the printer driver performs further additional processing in order to generate data which can be used by the printer.

However, several problems exist with the foregoing conventional configuration. First, the transfer time from the 16-bit portion of the printer driver to the 32-bit portion can be significant, particularly when the 16-bit portion of the driver spools the print data to a spool file. In this regard, the RGB data are usually represented by 8 bits per pixel per color. Accordingly, a single 8½'×11' page can require the 16-bit portion to spool to disk, and then the 32-bit portion to read from the disk, 33 megabytes of data. Correspondingly, 33 megabytes of disk space generally must be set aside per spooled page.

Moreover, as noted above, upon obtaining the RGB data the 32-bit portion of the conventional printer driver typically performs color matching, requiring additional processing time. Even if caching is used, this step still can consume significant processing time.

SUMMARY OF THE INVENTION

The present invention addresses these problems by providing a technique in which compressed image data can be used to access a look-up table.

In one aspect, compressed color image data are received, including a color table having first format data entries, each of which represents one of a number of different colors in a first data format, also including an index into the color table for each of several pixels. The first format data entries for the different colors are processed so as to obtain second format data entries, each of which represents one of the different colors in a second data format. A look-up table is then generated that includes the second format data entries for the different colors. A second format data value is then obtained for each of the pixels by using the index for the pixel to address the look-up table.

By virtue of the foregoing arrangement, faster conversion from one data format to another can often be achieved. Specifically, the invention allows for using the compressed image data to access a look-up table in order to obtain data in the desired format. Accordingly, in many cases this arrangement eliminates the need to first expand compressed image data before performing format conversion.

Another aspect of the invention is applicable in a windowing operating system where a 16-bit portion of a printer driver provides RGB color data to a 32-bit portion of the printer driver. The RGB color data are compressed in the 16-bit portion and utilized in the 32-bit portion. Specifically, in the 16-bit portion, a color table is generated and output which includes RGB values for each color in a part of the image. Also in the 16-bit portion, the RGB color data are compressed by outputting an index into the color table for each pixel in the part of the image. In the 32-bit portion, several color components, including CMYK components, are calculated for each of a number of colors in the color table and cached. Also in the 32-bit portion, for each of the pixels in the part of the image, the cached color components are accessed using the index into the color table generated in the 16-bit portion.

By virtue of this arrangement, the 16-bit portion of a printer driver can spool or directly transfer data to the 32-bit portion of the driver in an efficient manner. Moreover, according to this aspect of the invention, the received compressed data can be used by the 32-bit portion to index into a cache to perform efficient color matching.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
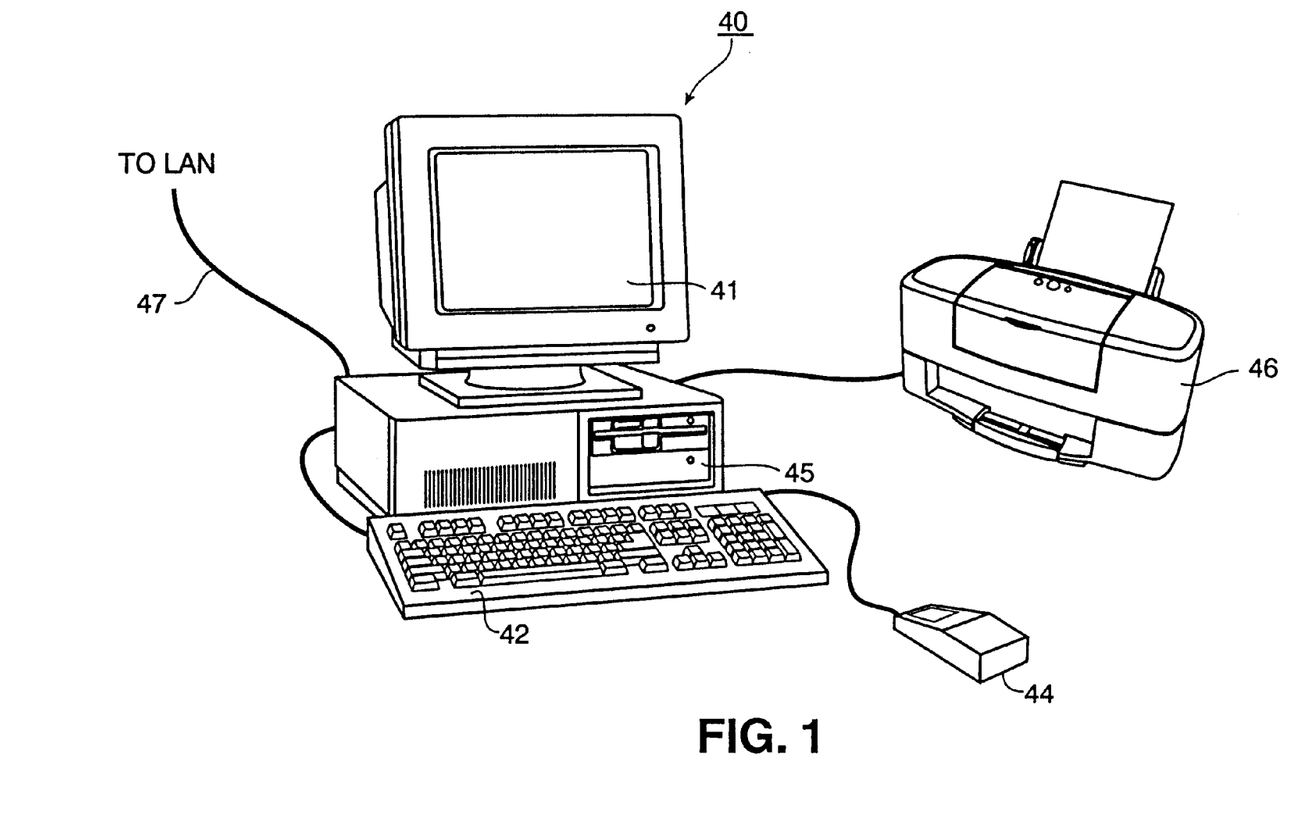
FIG. 1 is a perspective view of computing equipment which embodies the present invention.

FIG. 1 shows the outward appearance of a representative embodiment of the present invention. Shown in FIG. 1 is computing equipment 40, such as a Macintosh or an IBM PC-compatible computer having a windowing environment, such as Microsoft® Windows. Provided with computing equipment 40 is a color display screen 41, such as a color monitor, keyboard 42 for entering text data and user commands, and pointing device 44, such as a mouse, for pointing to and manipulating objects displayed on display screen 41.

Computing equipment 40 includes a mass storage device, such as computer disk 45, for storing data files, which can include image data files, text data files, and other data files in compressed or uncompressed format, for storing application programs such as word and spreadsheet processing programs, and for storing other executable code such as printer drivers. Such executable programs contain stored program instructions by which computing equipment 40 manipulates and stores data files on disk 45 and presents data in those files to an operator via the display screen 41 or by printing to color printer 46.

Image data may be generated internally in computing equipment 40 by executing application programs stored on disk 45 or may also be input into computing equipment 40 from a variety of other sources, such as from a scanner or a file server via local area network connection 47. It should be understood that, although a programmable general-purpose computer arrangement is shown in FIG. 1, a dedicated or stand-alone computer or other types of data processing equipment can be used in the practice of the present invention.

Figure 2:
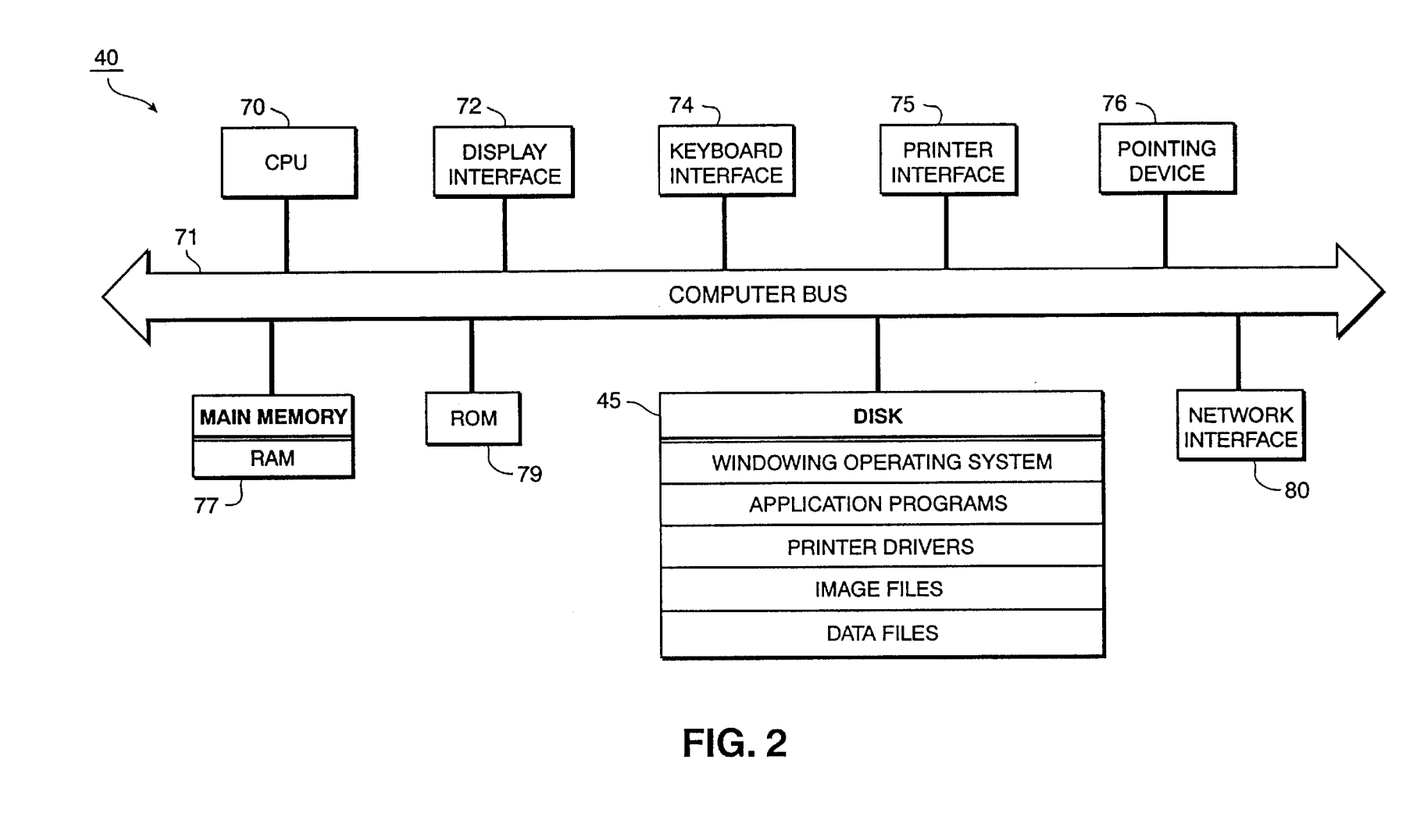
FIG. 2 is a block diagram of the computer workstation shown in FIG. 1.

FIG. 2 is a detailed block diagram showing the internal construction of computing equipment 40. As shown in FIG. 2, computing equipment 40 includes a central processing unit (CPU) 70 interfaced with computer bus 71. Preferably, CPU 70 is an Intel Pentium Processors®. Also interfaced with computer bus 71 is display interface 72, keyboard interface 74, printer interface 75, mouse interface 76, main memory 77, ROM 79, disk 45 and network interface 80.

Main memory 77 interfaces with computer bus 71 so as to provide random access storage for use by CPU 70 when executing stored program instructions, such as executable printer drivers for color printing, image processing programs, and various other application programs. More specifically, CPU 70 loads those programs from disk 45 into main memory 77 and executes those stored programs out of main memory 77.

Disk 45 stores various executable and data files, including a windowing operating system, various application programs, printer drivers, image files and other data files.

Preferably, the present invention is implemented in a printer driver which includes both a 16-bit portion and a 32-bit portion. A functional block diagram of the invention is illustrated in FIG. 3.

Figure 3:
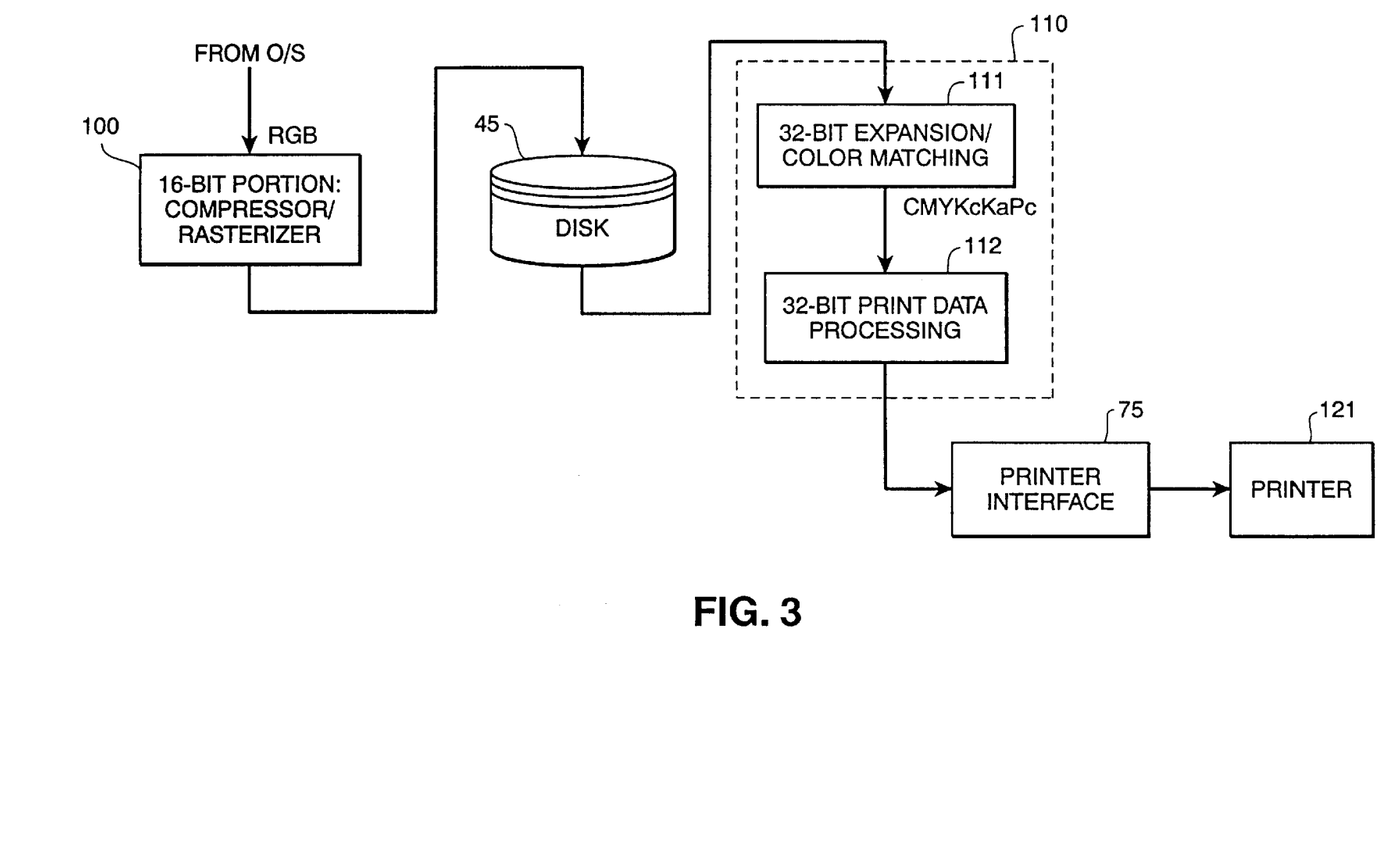
FIG. 3 is a functional block diagram illustrating the interaction of the software components according to the invention.

Referring to FIG. 3, the printer driver according to the invention includes a 16-bit portion 100 which provides a 16-bit compressor/rasterizer. The printer driver also includes a 32-bit portion 110 which is made up of a 32-bit expansion/color matching section 111 and a 32-bit print data processing section 112. Both the 16-bit portion 100 and the 32-bit portion 110 access disk 45. The 32-bit portion 110 also provides data to printer 121 via printer interface 75.

In operation, RGB data from the operating system is input into the 16-bit portion 100. The 16-bit portion 100 rasterizes and compresses the input RGB data, and then spools the compressed RGB data to disk 45. As noted above, the 16-bit portion may also transfer the compressed RGB data directly to 32-portion 110. Moreover, the 16-bit portion might instead spool the compressed RGB data to virtual memory. However, the following discussion will assume that the compressed data are spooled to disk 45.

Upon completion of spooling by 16-bit portion 100, the 32-bit expansion/color matching section 111 inputs the compressed RGB data from disk 45 and performs color matching processing in order to generate CMYK data. In the preferred embodiment, the CMYK data are then used to generate $CMYK_cK_aP_c$ data, as described in detail below. The $CMYK_cK_aP_c$ data are then further processed in the 32-bit print data processing section 112, in order to compensate for printer and output medium characteristics, to enhance the visual appearance of the printed output, and to generate data in a format usable by the printer 121.

The processed print data are then provided to printer interface 75, which provides an interface to printer 121. Printer 121 then physically prints onto an output medium based on the received print data.

Figure 4:
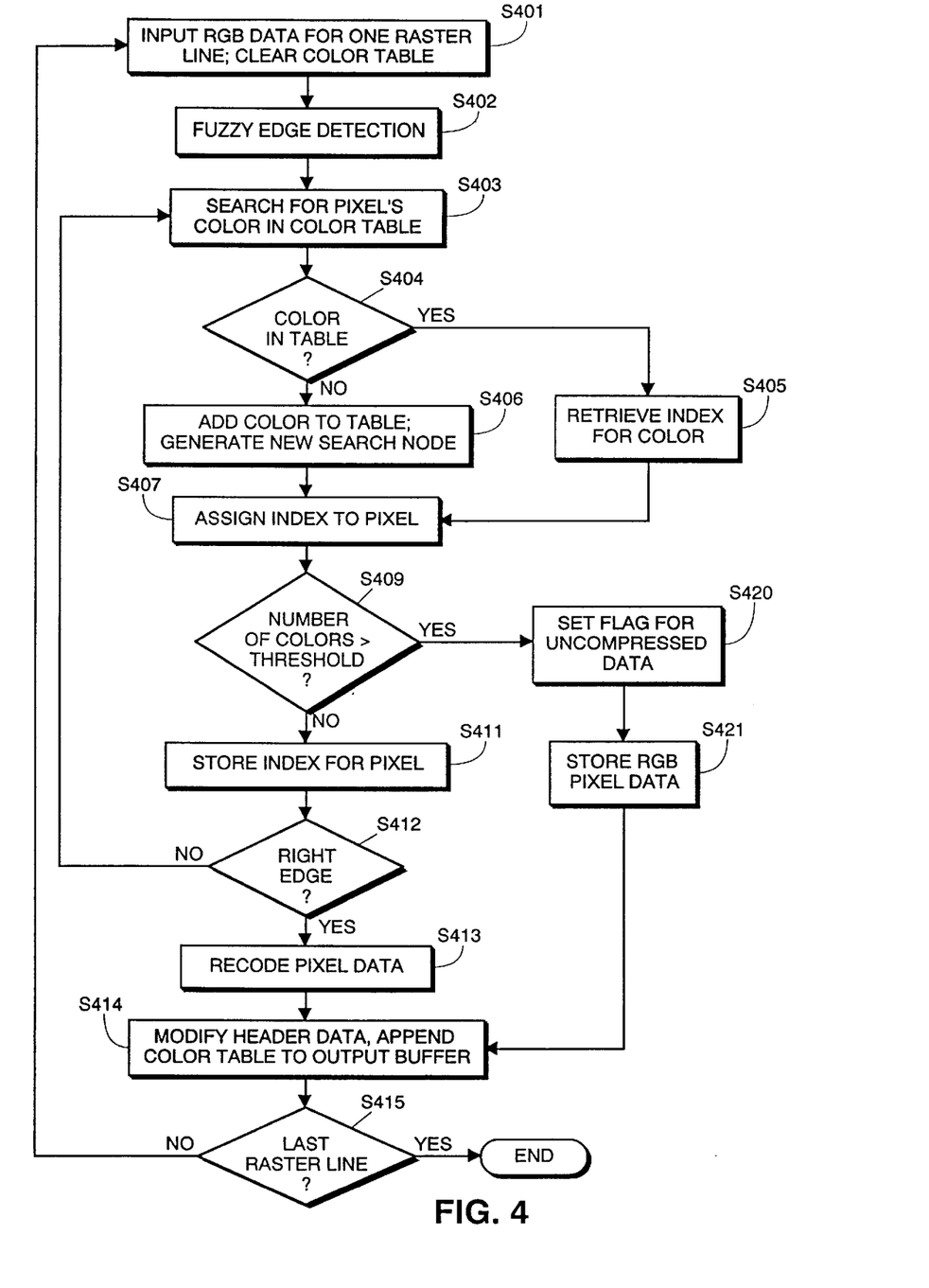
FIG. 4 is a flow diagram illustrating RGB color image data compression according to the invention.

The processing performed by the 16-bit compressor/rasterizer will now be described with reference to FIG. 4. Briefly, according to FIG. 4, RGB data are input for one raster line; fuzzy edge detection is performed; each pixel is examined to determine whether its color is in the color table; if not, the color is added to the table and a new search node is generated; an index is assigned to the pixel; if the number of colors exceeds a predetermined threshold, a flag is set to transfer the data in an uncompressed format and RGB pixel data are stored into an output buffer; when the right edge has been reached, the pixel data are recoded based on the number of colors in the color table, the header data are modified, and the color table is appended; the foregoing processing is then repeated for each raster line.

In more detail, in step S401 RGB data are input from the operating system for one raster line. Typically, the operating system will provide RGB data for a document to be printed when a user has entered a print command from an application program. Also in step S401, a new color table is initialized.

In step S402, the input raster line is searched from the left edge moving rightward in eight-pixel blocks. When a block containing a non-white pixel is encountered, an approximate left edge is identified as the leftmost pixel in the current block. A similar process is then performed from the right edge moving leftward in order to identify an approximate right edge of the document. Specifically, the input raster line is searched in eight-pixel blocks from the right edge moving leftward. When a block containing a non-white pixel is encountered, an approximate right edge is identified as the rightmost pixel of the current block. However, if the entire raster line consists of white space, then the right edge is set to be zero. Otherwise, the actual pixel positions of both the approximate left edge and right edge are output and are inserted into the header data described below.

In step S403, a search is performed to determine whether the color of the current pixel is in the color table. Preferably, the search is performed using search nodes generated from previous pixels. The generation of such nodes is discussed below in connection with step S406.

When searching the table, it is preferable to use root search nodes that are indexed by using one of the color components, such as the red value. Thus, there are 256 root nodes, corresponding to the 256 possible red component values. From the root nodes, a concatenation of the G and B color component values for the current pixel (the pixel's GB value) is preferably used to perform a binary search of the existing nodes, as follows.

Preferably, each search node includes four 16-bit words. The first word ordinarily indicates the color's index, but for each root node also provides a flag indicating if the root node has no colors associated with it. The second word is a concatenation of the G and B 8-bit color component values for the color associated with the node (the node's GB value). The third 16-bit word ordinarily provides a pointer to the next node in the event that the current pixel's GB value is less than the GB value of the current node, and the fourth word ordinarily provides a pointer to the next node in the event that the current pixel's GB value is greater than that of the current node. However, either or both of the third and fourth words may include a termination flag indicating that no further nodes exist in that particular direction of the search tree.

As noted above, a root node preferably is initially indexed using the input color's red component value. Thereafter, the current pixel's GB value is compared against the GB value for the current node. If the values are identical, then it is determined that the input pixel is the same color as the current node. Otherwise, a new node is selected based on whether the current pixel's GB value is less than or greater than the GB value of the current node. A binary search is thus performed in this manner until either the color is located or a termination flag is encountered, the latter condition indicating that the current pixel's color does not currently exist in the color table.

In step S404, if the color of the current pixel was not located in step S403, then processing proceeds to step S406. If the color was found, then processing proceeds to step S405, where the index is retrieved.

In step S406, the RGB values for the current pixel are added to the color table and are assigned a new index number. Preferably, the index numbers are 16-bit values and are assigned in sequential order, beginning with zero, as each new color is added to the color table. Also in step S406, a new search node is generated for the color of the current pixel. Each such new node preferably has the format described above in connection with the discussion of step S403.

Figure 5:
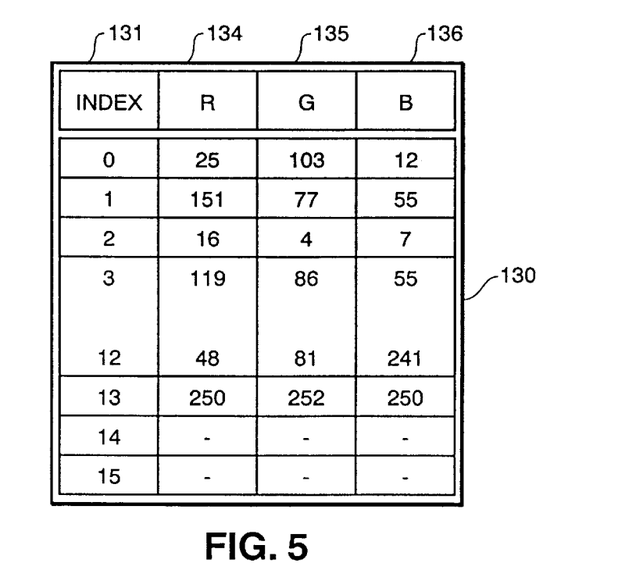
FIG. 5 illustrates a color table generated according to a representative embodiment of the invention.

An example of a completed color table is shown in FIG. 5. As can be seen from FIG. 5, each color has associated with it an index 131, a red value 134, a green value 135 and a blue value 136. In the table shown in FIG. 5, only 14 different colors (Indexes 0 to 13) have been identified in the current raster line.

In step S407, the 16-bit index corresponding to the pixel's color is assigned to the pixel. If the color is new, the newly generated index is assigned to encode the pixel. Otherwise, the index retrieved in step S405 is assigned to encode the pixel.

In step S409, if the number of colors in the color table is greater than a predetermined threshold, then processing proceeds to step S420. Otherwise, processing proceeds to step S411. In the present embodiment, to prevent the size of the compressed data from being larger than the size of the uncompressed data, the threshold is set equal to the quantity (right edge-left edge)/2, where the right edge and the left edge were determined in step S402. At 720 dpi, the foregoing provides a maximum threshold of fewer than 4,096 colors for A3-size paper.

If there are more than the threshold number of colors in the color table, in step S420 a flag is set to spool the data in an uncompressed format and the flag is provided to the header portion of an output buffer which is described in more detail below. Then, in step S421 the RGB pixel data are stored into the output buffer immediately after the header data.

If the number of colors in the color table is less than or equal to the threshold, in step S411 the index assigned to the pixel in step S407 is stored in the output buffer for the pixel. Preferably, the pixel index data is stored in the output buffer beginning immediately after the header portion.

In step S412, if the current pixel is at the right edge of the raster line, then processing proceeds to step S413. Otherwise, processing returns to step S403 to search for the color of the next pixel.

In step S413, the pixel data generated in step S407 are recoded based on the total number of colors in the color table. As noted above, each pixel index is initially 16 bits. Preferably, recoding shortens this length to one of twelve bits, eight bits, four bits or one bit. Thus, if the number of colors is greater than 256 and less than or equal to 4,096, the index length is shortened to twelve bits, because only twelve bits are required to index up to 4,096 different colors. If the number of colors is greater than 16 but less than or equal to 256, then the length of each index is reduced to eight bits, because only eight bits are required for 256 different colors. Similarly, if there are more than two colors and less than or equal to 16, then the index length is reduced to four bits. Finally, if only two colors exist in the color table, then the length of each index is reduced to one bit. The foregoing pixel data recoding preferably is performed in place using shift and OR operations.

Figure 6:
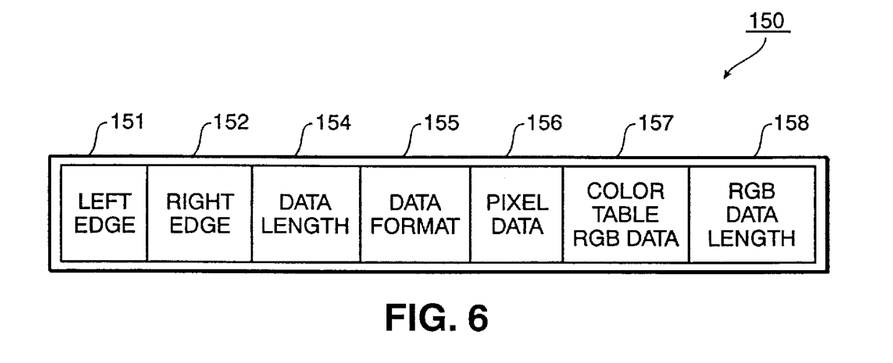
FIG. 6 illustrates the data format of a spooled raster line according to the invention.

In step S414, the header data are modified and, if compression is being used for the current raster line, the color table is appended to the output buffer for the current raster line. The final output buffer 150 is shown in FIG. 6. First, fixed-length words are used to indicate the left edge 151 and right edge 152 pixel positions determined in step S402. As noted above, if the right edge is indicated as zero then the raster line is all white. Accordingly, in this case only the left edge 151 and the right edge 152, and no other data, need to be output for the current raster line.

On the other hand, if the raster line does not consist only of white space, then the rest of the data format shown in FIG. 6 is also appended. First, the length of the compressed data for the raster line is calculated and then inserted into a fixed-length word position 154. Preferably, data length 154 indicates the total amount of data in buffer 150 for the current raster line. The data format 155 is then indicated. Specifically, the data format indicator 155 denotes either no compression (set in step S420) or else one of: 12-bit indexes, 8-bit indexes, 4-bit indexes or 1-bit indexes (set in step S413). Left edge 151, right edge 152, data length 154 and data format 155 together make up the header portion of the buffer data.

The pixel data 156 are represented next in the output buffer 150. As mentioned above, in the event the output data are compressed, the pixel data consist of a 12-bit, 8-bit, 4-bit or 1-bit index for each pixel in the raster line. Otherwise, the pixel data consist of RGB values for each pixel.

Finally, if the data are compressed the color table RGB values 157 and the total length 158 of the color table RGB values also are appended. Because the RGB values are arranged in order of increasing index number, the index information from color table 130 need not be included in the output buffer. If the data are uncompressed, no color table or color table length exists. Thus, in the event that the data are uncompressed, the header portion is followed immediately by RGB pixel data 156 only. After the output buffer 150 for the current raster line has been assembled, the data are output.

In step S415, if another raster line exists, processing returns to step S401, in which the next raster line is input. Otherwise, processing is completed.

Figure 7:
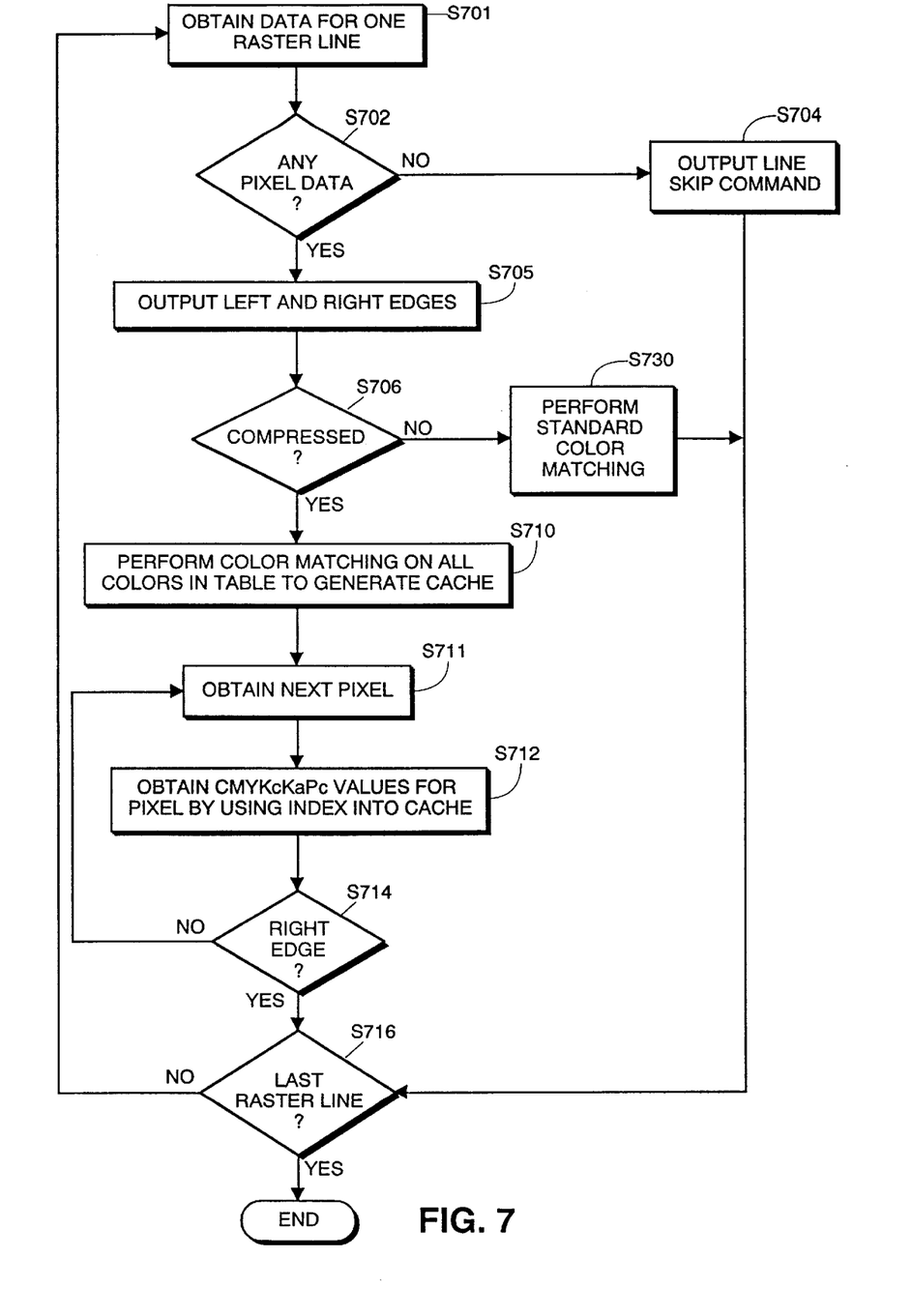
FIG. 7 is a flow diagram illustrating combined data expansion/color matching using compressed data to access a look-up table according to the invention.

Next, the processing by 32-bit expansion/color matching section 111 will be described with reference to FIG. 7. Briefly, according to FIG. 7, data are obtained for one raster line; next, the left and right edges are output; if the data are compressed, color matching is performed on all colors in the table to generate a cache look-up table; $CMYK_cK_aP_c$ values are then obtained for each pixel by using the pixel's index as an address into the cache look-up table; the foregoing processing is then repeated for each pixel in the raster line; and upon completion of the current raster line the next raster line is input and the processing is repeated. Standard color matching processing is performed in the event that the data are uncompressed.

In more detail, in step S701 the first line of raster data is obtained. Preferably, data are read into a buffer in fixed-sized blocks from disk 45. As noted above, the raster line preferably has the format described in connection with the explanation of step S414 above.

In step S702, right edge 152 is tested to determine whether there are any pixel data in the raster line. As noted above, if right edge 152 is equal to zero then the entire raster line consists of white space. Accordingly, if right edge 152 equals zero and no pixel data are present then processing proceeds to step S704. On the other hand, if right edge 152 is not equal to zero, then processing proceeds to step S705.

In step S704, a line skip command is output, indicating that the entire raster line consists of white space. In the preferred embodiment, this step is effected by incrementing a skip count. Rather than outputting a line skip command as in this embodiment, it is noted that it is instead possible to merely output a line of white pixels. However, this latter alternative generally will not provide the same efficiencies in subsequent data processing.

On the other hand, if pixel data are present for the current line, then in step S705 left edge 151 and right edge 152 are output for use in subsequent data processing.

In step S706, data format indicator 155 is tested to determine whether the data are compressed. If the data are uncompressed, then processing proceeds to step S730 which is described in more detail below. If the data are compressed, then processing proceeds to step S710.

In step S710, color matching calculations are performed for each color in the color table in order to generate a cache look-up table. Preferably, this step is performed as follows:

C=h(R)

M=h(G)

Y=h(B)

More preferably, h(x)=255−x (x=0, 1, 2, . . . 255)

when the RGB values have been provided as computer generated graphics. Otherwise, for input data from other sources such as video or monitor generated documents, h(x) is provided via a look-up table specifically tailored to the particular input source.

Undercolor removal is then performed in order to extract a black component (K) from the CMY data. Preferably, this step is performed as follows:

K=min(C,M,Y)

C=C−K

M=M−K

Y=Y−K

In the preferred embodiment, upon obtaining the CMYK values, additional values of $K_c$, $K_a$ and $P_c$ are determined. Specifically, $K_c$ is set equal to K. $K_a$ is set equal to 0 if all of C, M and Y are equal to 0; otherwise, $K_a$ is set equal to K. $P_c$ functions as an 8-bit flag, and is set equal to 0 if all of C, M and Y are equal to 0; otherwise, $P_c$ is set equal to 255. In this embodiment, $K_c$, $K_a$ and $P_c$ are determined in order to facilitate subsequent color processing. However, the calculation of these additional parameters is not necessary to the invention, and in other embodiments this step might instead simply output CMYK values.

Figure 8:
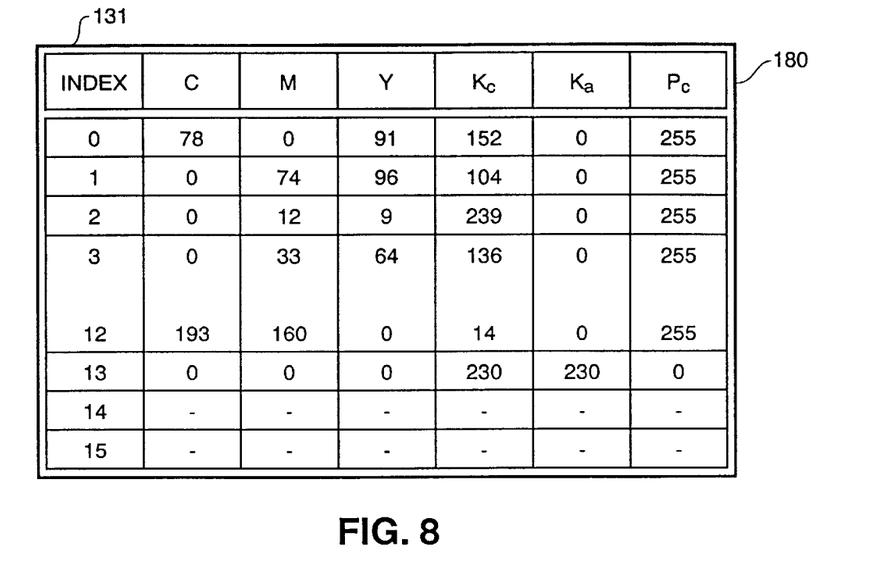
FIG. 8 illustrates a cache look-up table according to a representative embodiment of the invention.

Upon completion of step S710 a cache look-up table 180 is generated as shown in FIG. 8. Specifically, cache look-up table 180 has been generated by performing color matching processing on the color values in color table 130 shown in FIG. 5. As shown in FIG. 8, cache look-up table 180 has entries for each color in color table 130, with each color in color table 130 having the same index 131 as in cache look-up table 180. Thus, the $CMYK_cK_aP_c$ values shown in cache look-up table 180 for a given index are derived from the RGB components shown for that index in color table 130.

Returning to FIG. 7, in step S711, the first pixel is examined.

In step S712, $CMYK_cK_aP_c$ values are obtained for the pixel by using the pixel's index 131 as an index into cache look-up table 180.

In step S714, if the current pixel is not the right edge 152, then processing proceeds to step S711 to obtain the next pixel. Otherwise, processing proceeds to step S716.

In step S716, if there are more raster lines, processing proceeds to step S701 to obtain data for the next raster line. Otherwise, processing is completed.

As noted above, in the event that the raster line has been received in uncompressed format, processing proceeds to step S730, in which standard color matching is performed. Specifically, in step S730 RGB data are received for each pixel. Accordingly, the RGB data are converted into $CMYK_cK_aP_c$ data in the same manner that colors in the color table are converted in step S710. However, in order to reduce processing time it is preferable that step S730 employ a conventional caching technique in order to avoid repeatedly processing frequently occurring colors.

The present invention thus permits the 16-bit portion of a printer driver to spool, or directly transfer, data to the 32-bit portion of the driver in an efficient manner. Specifically, depending on the number of colors in a raster line, the line can be spooled and stored in as few as eight, four or even one bit per pixel, plus the color table. Moreover, according to the invention, the received compressed data can be used by the 32-bit portion to index into a look-up table to perform efficient color matching. In particular, this feature of the invention can often avoid the need to separately expand the compressed data and then perform color matching.

In this regard, the invention has been described with respect to particular illustrative embodiments. However, it is to be understood that the invention is not limited to the above-described embodiments and that various changes and modifications may be made by those of ordinary skill in the art without departing from the spirit and the scope of the invention.

What is claimed is:

1. A method for utilizing compressed color image data, comprising:

receiving compressed color image data which include a color table having first format data entries, each of which represents one of plural different colors in a first data format, the compressed color image data also including an index for each of plural pixels, said index corresponding to one of indices existing in the color table;

processing the first format data entries for the plural different colors so as to obtain plural second format data entries, each of which represents one of the plural different colors in a second data format;

generating a look-up table that includes the second format data entries for the plural different colors; and obtaining a second format data value for each of the plural pixels by using the index for said pixel to address the look-up table.

2. A method according to claim 1, wherein the second format data entries are organized by index in the look-up table.

3. A method according to claim 1, wherein the color table stores RGB values for each color.

4. A method according to claim 3, wherein the look-up table stores CMY values corresponding to the RGB values for each color in the color table.

5. A method according to claim 3, wherein the look-up table stores CMYK values corresponding to the RGB values for each color in the color table.

6. A method according to claim 1, wherein said processing step separately processes the first format data entry for each color in the color table.

7. A method according to claim 1, wherein the color table also stores data indicating an amount white space.

8. A method according to claim 7, wherein the amount of white space is indicated by specifying approximate left and right edges of non-white pixel data.

9. In a windowing operating system where a 16-bit portion of a printer driver provides RGB color data to a 32-bit portion of the printer driver, a method for compressing the RGB color data in the 16-bit portion and utilizing the compressed color data in the 32-bit portion, comprising:

in the 16-bit portion, generating and outputting a color table which includes RGB values for each color in a part of the image;

in the 16-bit portion, compressing the RGB color data by outputting an index into the color table for each pixel in the part of the image;

in the 32-bit portion, calculating plural color components, including CMYK components, for each of plural colors in the color table and caching the plural color components;

in the 32-bit portion, for each of plural pixels in the part of the image, accessing the cached color components using the index into the color table generated in the 16-bit portion.

10. A method according to claim 9, wherein the part of the image is exactly one raster line.

11. A method according to claim 9, wherein the step of generating and outputting the color table in the 16-bit portion includes a step of generating a new search node for each new color.

12. A method according to claim 11, wherein one of the RGB values is designated as an index to a root node for searching the color table.

13. A method according to claim 9, wherein a bit-length of the index is based upon how many different colors exist in the part of the image.

14. A method according to claim 9, further comprising a step of counting a number of colors in the part of the image.

15. A method according to claim 14, wherein if a number of colors in the part of the image is greater than a predetermined threshold, the RGB color data is provided from the 16-bit portion to the 32-bit portion in an uncompressed format.

16. A method according to claim 9, further comprising a step of locating an approximate left edge and an approximate right edge of a non-white portion of the part of the image.

17. A computer-readable memory medium in which computer-executable process steps are stored, the process steps for utilizing compressed color image data, wherein the process steps comprise:

a receiving step to receive compressed color image data which include a color table having first format data entries, each of which represents one of plural different colors in a first data format, the compressed color image data also including an index for each of plural pixels, said index corresponding to one of indices existing in the color table;

a processing step to process the first format data entries for the plural different colors so as to obtain plural second format data entries, each of which represents one of the plural different colors in a second data format;

a generating step to generate a look-up table that includes the second format data entries for the plural different colors; and an obtaining step to obtain a second format data value for each of the plural pixels by using the index for said pixel to address the look-up table.

18. A computer-readable memory medium according to claim 17, wherein the second format data entries are organized by index in the look-up table.

19. A computer-readable memory medium according to claim 17, wherein the color table stores RGB values for each color.

20. A computer-readable memory medium according to claim 19, wherein the look-up table stores CMY values corresponding to the RGB values for each color in the color table.

21. A computer-readable memory medium according to claim 19, wherein the look-up table stores CMYK values corresponding to the RGB values for each color in the color table.

22. A computer-readable memory medium according to claim 17, wherein said processing step separately processes the first format data entry for each color in the color table.

23. A computer-readable memory medium according to claim 17, wherein the color table also stores data indicating an amount white space.

24. A computer-readable memory medium according to claim 23, wherein the amount of white space is indicated by specifying approximate left and right edges of non-white pixel data.

25. A computer-readable memory medium in which computer-executable process steps are stored, the process steps divided between a 16-bit portion and a 32-bit portion, the process steps for, in a windowing operating system where a 16-bit portion of a printer driver provides RGB color data to a 32-bit portion of the printer driver, compressing the RGB color data in the 16-bit portion and utilizing the compressed color data in the 32-bit portion, wherein the process steps comprise:

a generating step in the 16-bit portion to generate and output a color table which includes RGB values for each color in a part of the image;

a compressing step in the 16-bit portion to compress the RGB color data by outputting an index into the color table for each pixel in the part of the image;

a calculating step in the 32-bit portion to calculate plural color components, including CMYK components, for each of plural colors in the color table and to cache the plural color components;

an accessing step in the 32-bit portion, to access, for each of plural pixels in the part of the image, the cached color components using the index into the color table generated in the 16-bit portion.

26. A computer-readable memory medium according to claim 25, wherein the part of the image is exactly one raster line.

27. A computer-readable memory medium according to claim 25, wherein the generating step includes a step to generate a new search node for each new color.

28. A computer-readable memory medium according to claim 27, wherein one of the RGB values is designated as an index to a root node for searching the color table.

29. A computer-readable memory medium according to claim 25, wherein a bit-length of the index is based upon how many different colors exist in the part of the image.

30. A computer-readable memory medium according to claim 25, wherein the process steps further comprise a step to count a number of colors in the part of the image.

31. A computer-readable memory medium according to claim 30, wherein if a number of colors in the part of the image is greater than a predetermined threshold, the RGB color data is provided from the 16-bit portion to the 32-bit portion in an uncompressed format.

32. A computer-readable memory medium according to claim 25, wherein the process steps further comprise a step to locate an approximate left edge and an approximate right edge of a non-white portion of the part of the image.

33. An apparatus for utilizing compressed color image data, comprising:

a memory for storing computer executable process steps; and a processor for executing the process steps stored in said memory;

wherein said process steps include steps to receive compressed color image data which include a color table having first format data entries, each of which represents one of plural different colors in a first data format, the compressed color image data also including an index for each of plural pixels, said index corresponding to one of indices existing in the color table; process the first format data entries for the plural different colors so as to obtain plural second format data entries, each of which represents one of the plural different colors in a second data format; generate a look-up table that includes the second format data entries for the plural different colors; and obtain a second format data value for each of the plural pixels by using the index for said pixel to address the look-up table.

34. An apparatus according to claim 33, wherein the second format data entries are organized by index in the look-up table.

35. An apparatus according to claim 33, wherein the color table stores RGB values for each color.

36. An apparatus according to claim 35, wherein the look-up table stores CMY values corresponding to the RGB values for each color in the color table.

37. An apparatus according to claim 35, wherein the look-up table stores CMYK values corresponding to the RGB values for each color in the color table.

38. An apparatus according to claim 33, wherein said processing step separately processes the first format data entry for each color in the color table.

39. An apparatus according to claim 33, wherein the color table also stores data indicating an amount white space.

40. An apparatus according to claim 39, wherein the amount of white space is indicated by specifying approximate left and right edges of non-white pixel data.

41. In a windowing operating system where a 16-bit portion of a printer driver provides RGB color data to a 32-bit portion of the printer driver, an apparatus for compressing the RGB color data in the 16-bit portion and utilizing the compressed color data in the 32-bit portion, comprising:

a memory for storing computer executable process steps; and a processor for executing the process steps stored in said memory;

wherein said process steps include a generating step in the 16-bit portion to generate and output a color table which includes RGB values for each color in a part of the image; a compressing step in the 16-bit portion to compress the RGB color data by outputting an index into the color table for each pixel in the part of the image; a calculating step in the 32-bit portion to calculate plural color components, including CMYK components, for each of plural colors in the color table and to cache the plural color components; an accessing step in the 32-bit portion to access, for each of plural pixels in the part of the image, the cached color components using the index into the color table generated in the 16-bit portion.

42. An apparatus according to claim 41, wherein the part of the image is exactly one raster line.

43. An apparatus according to claim 41, wherein the generating step includes a step to generate a new search node for each new color.

44. An apparatus according to claim 43, wherein one of the RGB values is designated as an index to a root node for searching the color table.

45. An apparatus according to claim 41, wherein a bit-length of the index is based upon how many different colors exist in the part of the image.

46. An apparatus according to claim 41, wherein said process steps further comprise a step to count a number of colors in the part of the image.

47. An apparatus according to claim 46, wherein if a number of colors in the part of the image is greater than a predetermined threshold, the RGB color data is provided from the 16-bit portion to the 32-bit portion in an uncompressed format.

48. An apparatus according to claim 41, wherein said process steps further comprise a step locate an approximate left edge and an approximate right edge of a non-white portion of the part of the image.

49. A method for utilizing compressed color image data, comprising:

receiving compressed color image data representing exactly one raster line of an image, the compressed color image data including a color table having first format data entries, each of which represents one of a plural different colors in a first data format, the compressed color image data also including an index into the color table for each of the plural pixels, wherein the compressed color image data represent exactly one raster line of an image;

processing the first format data entries for the plural different colors so as to obtain plural second format data entries, each of which represents one of the plural different colors in a second data format;

generating a look-up table that includes the second format data entries for the plural different colors; and obtaining a second format data value for each of the plural pixels by using the index for said pixel to address the look-up table.

50. A computer-readable memory medium in which computer-executable process steps are stored, the process steps for utilizing compressed color image data, wherein the process steps comprise:

a receiving step to receive compressed color image data representing exactly one raster line of an image, the compressed color image data including a color table having first format data entries, each of which represents one of a plural different colors in a first data format, the compressed color image data also including an index into the color table for each of the plural pixels, wherein the compressed color image data represent exactly one raster line of an image;

a processing step to process the first format data entries for the plural different colors so as to obtain plural second format data entries, each of which represents one of the plural different colors in a second data format;

a generating step to generate a look-up table that includes the second format data entries for the plural different colors; and an obtaining step to obtain a second format data value for each of the plural pixels by using the index for said pixel to address the look-up table.

51. An apparatus for utilizing compressed color image data, comprising:

a memory for storing computer executable process steps; and a processor for executing the process steps stored in said memory;

wherein said process steps include steps to receive compressed color image data representing exactly one raster line of an image, the compressed color image data including a color table having first format data entries, each of which represents one of a plural different colors in a first data format, the compressed color image data also including an index into the color table for each of the plural pixels, wherein the compressed color image data represent exactly one raster line of an image; process the first format data entries for the plural different colors so as to obtain plural second format data entries, each of which represents one of the plural different colors in a second data format; generate a look-up table that includes the second format data entries for the plural different colors; and obtain a second format data value for each of the plural pixels by using the index for said pixel to address the look-up table.

\* \* \* \* \*

UNITED STATES PATENT AND TRADEMARK OFFICE
CERTIFICATE OF CORRECTION

PATENT NO. : 6,198,543 B1  
DATED : March 6, 2001  
INVENTOR(S) : Dennis L. Ryan Page 1 of 1

It is certified that error appears in the above-identified patent and that said Letters Patent is hereby corrected as shown below:

Column 1,  
Line 23, "green" should read -- green, --.  
Line 45, "8½'X11'" should read -- 8½"X11" --.

Column 3,  
Line 67, "32-portion" should read -- 32-bit portion --.

Column 9,  
Line 25, "amount" should read -- amount of --.

Column 10,  
Line 45, "amount" should read -- amount of --.

Column 11,  
Line 67, "amount" should read -- amount of --.

Column 12,  
Line 47, "step" should read -- step to --.  
Line 55, "represents one of a plural" should read -- represents one of plural --.

Column 13,  
Line 12, " a plural" should read -- plural --.

Column 14,  
Line 12, "represents one of a plural" should read -- represents one of plural --.

Signed and Sealed this

Twenty-sixth Day of February, 2002

*Attest:*

JAMES E. ROGAN  
*Director of the United States Patent and Trademark Office*

*Attesting Officer*